US005822502A

United States Patent [19]
Li et al.

[11] Patent Number: 5,822,502
[45] Date of Patent: Oct. 13, 1998

[54] CLUSTER DITHER INK DUTY LIMIT CONTROL

[75] Inventors: Chia-Hsin Li; Joseph Shu, both of San Jose, Calif.

[73] Assignee: Seiko Epson Corporation, Tokyo, Japan

[21] Appl. No.: 716,950

[22] Filed: Sep. 20, 1996

[51] Int. Cl.$^6$ ............... G06K 1/00; B41J 3/36; G03B 21/60; G02B 5/126

[52] U.S. Cl. ............ 395/109; 395/102; 347/251; 358/298; 358/456; 358/457; 358/466; 358/534; 358/535; 358/536

[58] Field of Search ............. 395/102, 109, 395/112; 358/298, 455, 443, 447, 456, 457, 466, 534, 535, 536, 448; 347/15, 131, 251; 382/237, 270, 258

[56] References Cited

U.S. PATENT DOCUMENTS

| | | | |
|---|---|---|---|
| 4,196,454 | 4/1980 | Warren | 358/283 |
| 4,339,774 | 7/1982 | Temple | 358/283 |
| 4,345,313 | 8/1982 | Knox | 364/515 |
| 4,449,150 | 5/1984 | Kato | 358/283 |
| 4,668,995 | 5/1987 | Chen et al. | 358/282 |
| 5,173,745 | 12/1992 | Hanse | 356/350 |
| 5,377,024 | 12/1994 | Dillinger | 358/502 |
| 5,416,612 | 5/1995 | Ingraham et al. | 358/501 |
| 5,438,431 | 8/1995 | Ostromoukhovc | 358/457 |
| 5,463,703 | 10/1995 | Lin | 382/251 |
| 5,469,515 | 11/1995 | Lin | 358/457 |
| 5,473,446 | 12/1995 | Perumal, Jr. et al. | 358/523 |
| 5,617,123 | 4/1997 | Takaoka et al. | 347/15 |
| 5,633,662 | 5/1997 | Allen et al | 347/15 |

*Primary Examiner*—Kim Yen Vu
*Assistant Examiner*—Mark Wallerson
*Attorney, Agent, or Firm*—Michael T. Gabrik

[57] ABSTRACT

A method and apparatus for selectively depositing ink on a recording medium is described. The method and apparatus implement a technique in which portions of a clustered-dot dither matrix are identified and no ink is deposited under any circumstances in the so-identified portions. The portions are organized into a relatively large dispersed distribution matrix within the clustered-dot dither matrix.

22 Claims, 6 Drawing Sheets

CLUSTER DITHER INK DUTY LIMIT CONTROL

FIELD OF THE INVENTION

The present invention relates generally to printing halftone images and more particularly to methods and apparatus for reducing the amount of ink used to print halftone images using a clustered-dot dithering technique.

BACKGROUND OF THE INVENTION

As is known in the art, spatial dithering or more simply dithering is a technique for generating an image with many colors on a device such as a printer, having fewer colors than the image. The colors are simulated by the device by producing groups of closely spaced dots which are typically of equal size. Images generated in this manner are typically referred to as halftone images.

In the printing industry, one common dithering method for generating halftone images using printing devices which can produce only binary picture elements is the ordered dither method. This method includes the steps of sub-dividing an entire output image space into repetitive adjoining rectangular area screen elements. The inside of each screen element is gradually colored according to the color of the original image, thus insuring the presence of various colors in the reproduction.

According to the particular dither method used to fill in the screen elements, it is possible to distinguish two families of dithering methods. The first family of dithering methods is referred to as dispersed-dot ordered dithering and the second family of dithering methods is referred to as clustered-dot ordered dithering.

Clustered-dot dithering is typically used with high and medium resolution (greater than or equal to 200 dots per inch) image generating devices. In the clustered-dot dithering technique the dots are clustered at or near the middle of each screen element, thus forming round figures. The images produced using this method are typically visually pleasing, however, in the case of a printer printing with a resolution in the range of about 200–600 dots per inch (dpi), the number of distinct colors which can be obtained using this method is greatly restricted due to the discreet nature of the screen elements.

In printing relatively high resolution images (e.g. image having a resolution greater than 600 dpi) over inking problems occur due to the application of an amount of ink on a recording media such as paper which is greater than the amount of ink which the recording media can absorb. This results in the recording media having locations at which the ink is wet. Moreover, colors in these over-inked image regions are typically darker than intended. Such over inking typically occurs due to overlapping regions of dots used to produce the halftone image.

Prior attempts to solve such over inking problems have focused on reducing the maximum ink discharged by a printer in a given area of the recording media. The maximum ink discharged by a printer is typically reduced by reducing ink duty limits for each color ink used in the image. While this approach is acceptable for most random and uniform ink placement operations, when clustered-dot dithering is used, such ink reduction techniques may produce undesirable white holes or gaps in the image. Moreover, localized over inking in the dots can occur in regions of the recording media adjacent to these gaps. This is especially noticeable when printing dark tones using clustered-dot dithering techniques.

It would, therefore, be desirable to provide a technique for reducing the amount of ink used by a printer which prints using a clustered-dot dither technique. It would also be desirable to provide a printing technique which minimizes excessive ink application caused by localized ink application beyond an ink duty limit of a recording media. It would also be desirable to provide a technique for printing relatively high resolution images having dark tone colors which are a desired shade of color.

SUMMARY OF THE INVENTION

In accordance with the present invention, a method for printing a high resolution image includes the steps of defining non-printable holes or regions in a clustered-dot dither matrix and arranging the holes into a relatively large disbursed distribution matrix within the clustered-dot dither matrix. The holes in the clustered-dot dither matrix define areas of the printed image in which no ink will be printed under any circumstances. With this particular technique, a reduction in image artifacts due to application of an excessive amount of ink in local regions of an image is provided. To compensate for grainy appearances which may occur in areas of the image where lighter tones exist, the non-printable holes in the clustered-dot dither matrix are made successively sparse in those regions of the image having an ink duty below a predetermined threshold level. This results in the existence of a minimum spacing between dots in lighter tone areas of the image in which ink will not be printed. Consequently, areas of an image in which relatively light tones exist appear smooth rather than grainy. It should be noted that the technique of the present invention can be implemented independently of actual clustered dithering activities and thus a variety of different clustered-dot dithering techniques can be used to generate the halftone image. Furthermore, by defining non-printable holes in the clustered-dot dither matrix, localized or global over inking problems are reduced without introducing perceptible white space artifacts between the dots produced via the clustered-dot dither matrix. Moreover, the non-printable hole regions themselves are not visually perceptible due to their disbursed distribution within the clustered-dot dither matrix.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Figure 1:
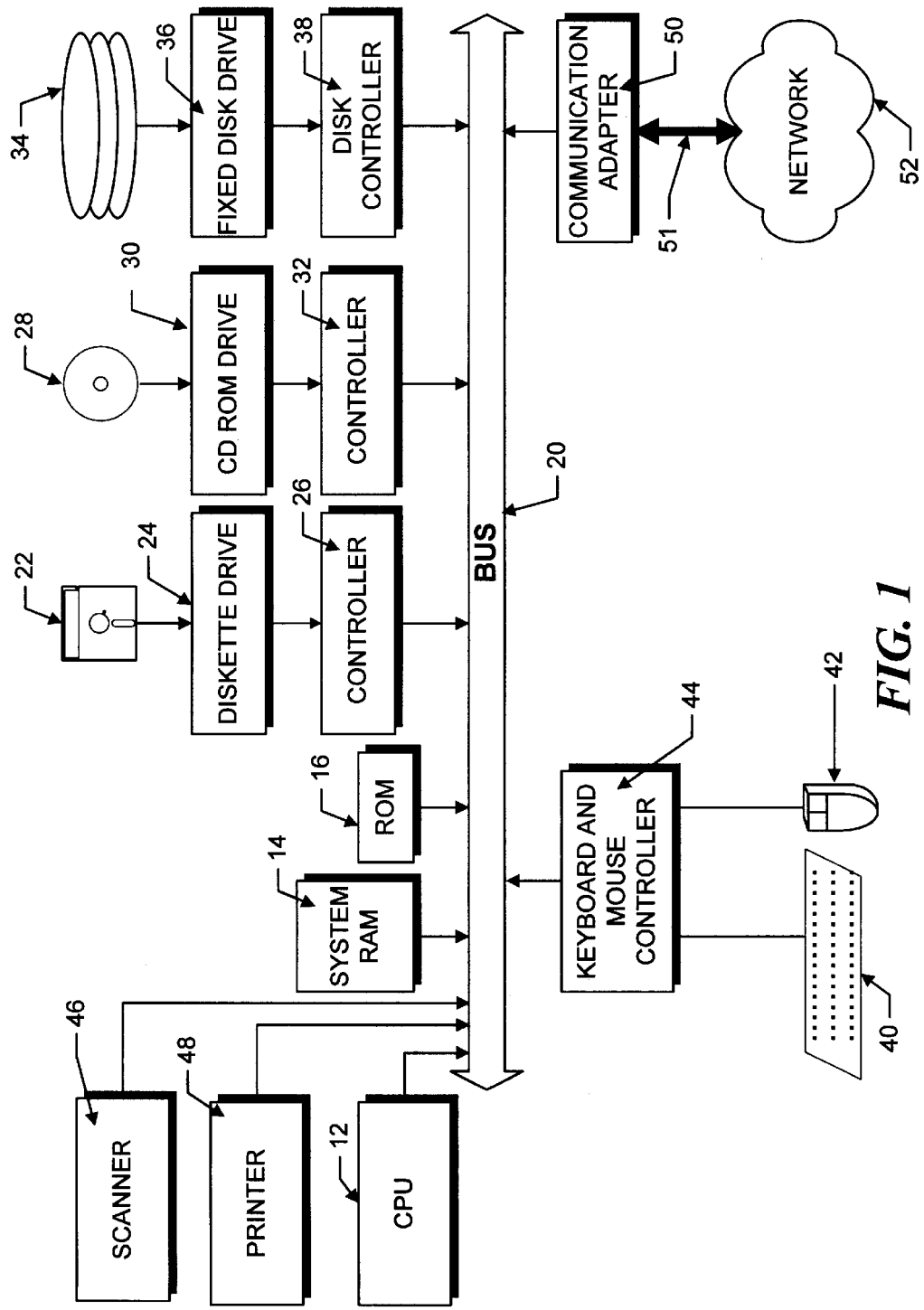
FIG. 1 is a block diagram of a computer system suitable for use with the present invention.

Referring now to FIG. 1, a computer system 10 on which the invention may be implemented is shown. Computer system 10 may be provided, for example, as an IBM compatible computer or an equivalent computer system, such as the types sold by Seiko Epson. The exemplary computer system 10 of FIG. 1 is for descriptive purposes only. Although the description may refer to terms commonly used in describing particular computer systems, the description and concepts equally apply to other systems, including systems having architectures dissimilar to FIG. 1.

Computer system 10 includes a central processing unit (CPU) 12, which may be provided, for example, as a conventional microprocessor, a random access memory (RAM) 14 for temporary storage of information, and a read only memory (ROM) 16 for permanent storage of information. Each of the aforementioned components are coupled to a bus 20. Operation of computer system 10 is generally controlled and coordinated by operating system software. The operating system software controls allocation of system resources and performs tasks such as processing, scheduling, memory management, networking, and I/O services, among things. Thus, an operating system resident in system memory and running on CPU 12 coordinates the operation of the other elements of computer system 10.

Also coupled to bus 20 is a non-volatile mass storage device which may be provided as a diskette 22. Diskette 22 is insertable into a diskette drive 24 which is, in turn, coupled to bus 20 by a controller 26. Similarly, a compact disc (CD) ROM 28 is insertable into a CD ROM drive 30 which is, in turn, coupled to bus 20 by a controller 28. A hard disk 34 is typically provided as part of a fixed disk drive 36 which is coupled to bus 20 by a disk controller 38.

Data and software may be provided to and extracted from computer system 10 via removable storage media such as diskette 22 and CD ROM 28. For example, data values generated using techniques to be described below in conjunction with FIGS. 2–5 may be stored on storage media similar to media 22, 28. The data values may then be retrieved from the media 22, 28 by CPU 12 and utilized by CPU 12 to perform color printing of images. Alternatively, CPU 12 may simply store such data values in ROM 16. Alternatively still, computer software useful for printing images on color printing peripherals may be stored on storage media similar to media 22, 28. Such computer software may be retrieved from media 22, 28 for immediate execution by CPU 12. CPU 12 may retrieve the computer software and subsequently store the software in RAM 14 or ROM 16 for later execution.

User input to computer system 10 may be provided by a number of devices. For example, a keyboard 40 and a mouse 42 are coupled to bus 20 by a controller 44. A scanner 46 which may be provided, for example, as a hand held scanner or a page scanner is coupled to bus 20. Scanner 46 is capable of scanning color images which may later be printed by a color printer 48 also coupled to the bus 20.

It should be noted that printer 48 may itself include a memory and a processor to which the CPU can provide electrical signals which control printer functions.

In system 10 the processor 12 provides printer signals to the printer 48 and in response thereto the printer 48 provides a printed page. The printer page may, for example, correspond to a page of text or alternatively the printed page may correspond to an image or alternatively still, the printed page may include a combination of text and one or more images. When printer 48 is provided as a color printer, the text and/or image may be provided as color text and/or image.

Printer 48 can produce halftone images on a recording media such as paper. For a halftone image, each pixel of the image either has a symbol printed or not printed. To print a halftone image, a source image must be transformed to a halftone image. One objective of the printing industry is to develop transformation techniques which result in halftone images which are visually indistinguishable from the source image.

One technique for transforming a source image to a halftone image utilizes a so-called dither matrix. The source image has many pixels, each pixel having a value. The dither matrix occupies a physical space and has numerous matrix elements each matrix element having a predetermined value. The dither matrix is mapped over the source image. For a source that is larger than the space occupied by the dither matrix, the dither matrix is replicated to cover the entire source image. The value of each element in the dither matrix is compared to a value of a corresponding pixel in the source image. If the value of the pixel in the source image is larger than the value of the corresponding element in the dither matrix a symbol will not be printed in a corresponding position of the halftone image. Thus, ordered dither is a point operation meaning that an output value depends only on the value of the current pixel.

To generate a visually pleasing halftone image using the above technique, the values of the elements in the dither matrix must be carefully selected. An ordered dither matrix is provided from a deterministic, periodic array of threshold values. The threshold values are ordered rather than random, since a fully random pattern of threshold values would result in generation of a halftone image having an appearance which is not as similar as possible to the source image.

An ordered dither algorithm generates a binary halftone image by comparing pixels from an original continuous-tone image to the threshold values in the dither matrix. Ordered dithering techniques can be divided into two classes by the nature of the dots produced. The first class is referred to clustered-dot dither and the second class is referred to as dispersed dot dither. Clustered-dot dither may be used for binary display devices such as printer 48. In particular, printer 48 utilizes the clustered-dot dither technique described below in conjunction with FIGS. 1A–5.

Computer system 10 also includes a communications adaptor 50 which allows the system to be interconnected to a local area network (LAN) or a wide area network (WAN), schematically illustrated by bus 51 and network 52. Thus, data and computer program software can be transferred to and from computer system 10 via adapter 50, bus 51 and network 52.

Figure 1A:
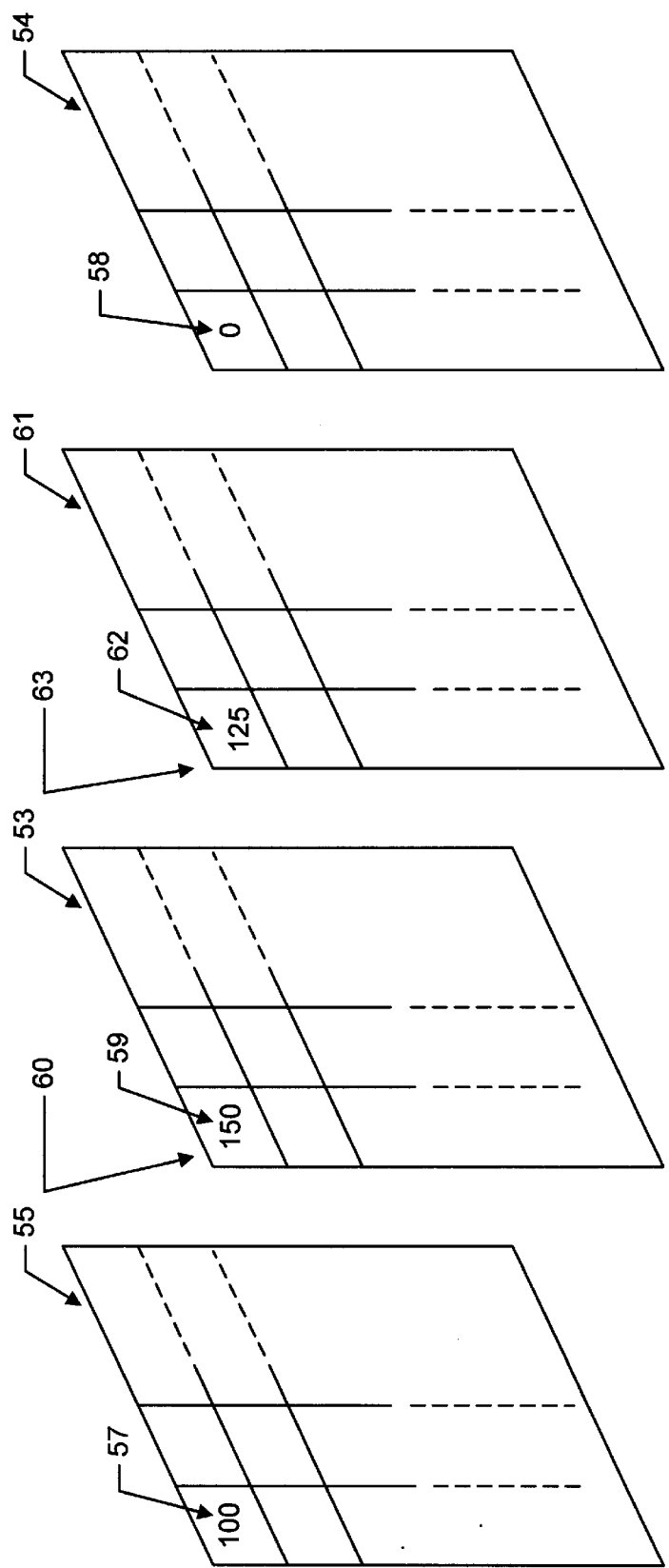
FIG. 1A is a diagrammatical view of a dither matrix and an ink reduction matrix.

Referring now to FIG. 1A, a dither matrix 53 used by the computer system 10 (FIG. 1) to provide printer signals used by printer 48 (FIG. 1) to generate a half tone image 54 from a source image 55 is shown. The halftone image 54, the source image 55 and the dither matrix 53 each represent a physical area of an image. The three areas are substantially equal to each other. Typically, the size of the dither matrix 53 is relatively small, for example, 0.5 cm by 0.5 cm. The source image 55 is typically larger in size than the dither matrix 53. The dither matrix 53 is thus replicated to cover the area of the source image 55 so as to generate the halftone image 54.

Both the halftone image 54 and the source image 55 have many pixels such as the source image pixel 57 and the halftone image pixel 58. Each pixel has a value. For example, the source image pixel 57 has a value of 100 and the halftone image pixel 58 has a value of 0. The dither matrix 53 has many elements, for example, element 59. In one preferred embodiment, the dither matrix 53 has 128 rows and 128 columns of elements each of which has a value and occupies a position in the dither matrix. For example, element 59 has a value of 150 and occupies a position 60.

Also shown is an ink reduction matrix 61. Each element in the ink reduction matrix 61 has a value and occupies a position in the ink reduction matrix 61. For example, element 62 has a value of 125 and occupies a position 63.

Both the source image 55 and halftone image 54 may be in black and white or color. One preferred way to represent color is to have three symbols for each pixel with each symbol having a different color.

The method of generating the halftone image 54 from the source image 55 includes the steps of identifying the color of each of the pixels in the source image 55, applying an ink duty limit to each of the pixels and comparing the value of each pixel in the source image 55 with the value of a corresponding element in the dither matrix 53. Based on the result of the comparison, the value of a corresponding pixel of a halftone image is determined. If the value of the pixel in the source image is greater than the value of the corresponding element in the dither matrix, then a dot of ink having the color of the pixel in the source image is included in the appropriate location of the halftone image.

In accordance with the present invention, however, for the ink dot to be applied to the recording medium on which the printer is printing the halftone image 54, a further condition must be met. Specifically, the product of a reduction rate for that pixel and a value which corresponds to a 100% ink duty limit must be greater than or equal to a value of a corresponding element in the ink reduction matrix 61. If this further condition is not met, then the ink dot is not included in the halftone image 54. Thus, the ink reduction matrix 61 defines regions or holes in the dither matrix 53. The holes in the dither matrix 53 define areas of the halftone image 54 in which no ink will be printed under any circumstances. The will be described in detail below in conjunction with FIG. 4.

At a one hundred percent ink duty limit, the clustered dots are relatively large resulting in a relatively dark shade of a color. This means that the recording medium (e.g. the paper) is essentially filled with ink over one hundred percent of the image area corresponding to that pixel region. At lower ink duty limits, lighter colors and shades result due to decreasing size of the cluster dots. Taken to one limit, at a zero percent ink duty limit, the color white results since no ink will be disposed on the recording medium. Similarly, taken to the opposite limit, if all available ink is applied at a one hundred percent ink duty limit a black color results.

The smallest cluster dot may correspond to one pixel. The holes in the dither matrix may be on the pixel or not. As will be explained in detail below in conjunction with FIGS. 4 and 5, to prevent the halftone image from having a "grainy" appearance in image regions having a relatively light tone, below a predetermined ink duty limit, multiple holes are prevented from existing in the dither matrix 53.

Figure 2:
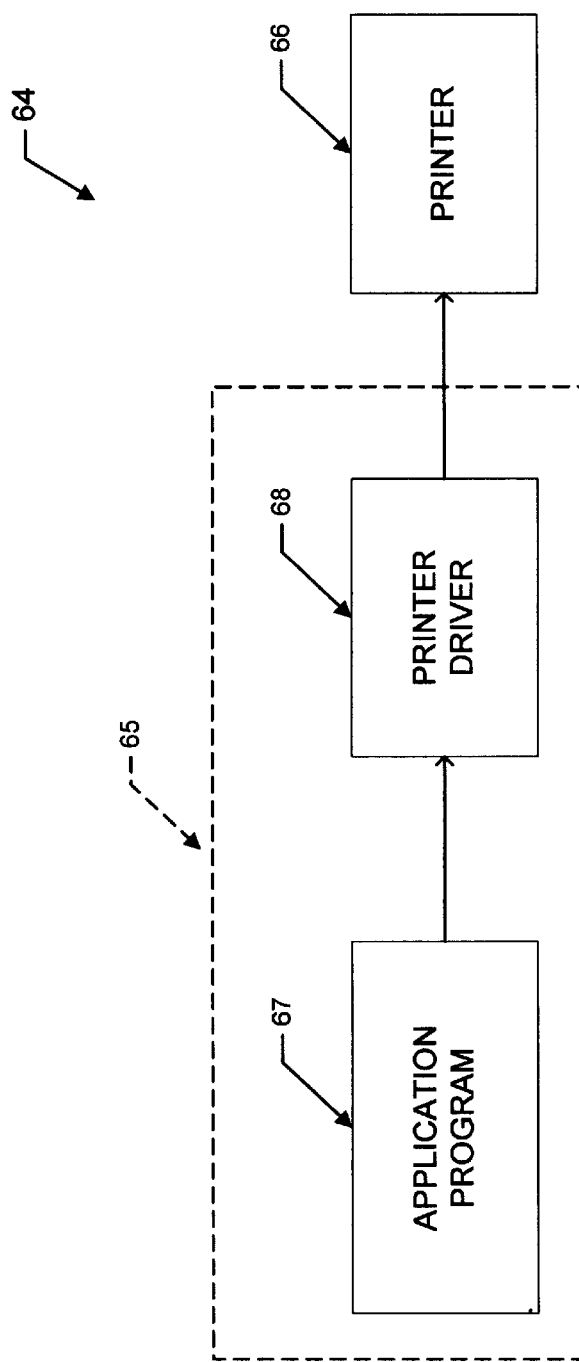
FIG. 2 is a block diagram of a computer executing an application computer program and a printer driver program.

Referring now to FIG. 2, a printing system 64 includes a computer system 65 which may be similar to computer system 10 described above in conjunction with FIG. 1. Coupled to computer system 65 is a printer 66. Computer system 65 executes operating system software or more simply an operating system and an application program software 67 or more simply an application program 67. Application program 67 is coupled to a printer driver 68. Printer driver 68 is typically provided as part of the operating system but is specific to the printer 66. Printer driver 68 receives a print command initiated by the application program 67 and performs the requested print operation. The printer driver 68 converts a device-independent representation of a source image into a halftone image as described above in conjunction with FIGS. 1 and 1A and provides to printer 66 printer instructions that will cause the printer 66 to print the halftone image. Prior to providing printer commands to printer 66, printer driver 68 typically performs one or more image processing steps as will be discussed below.

For example, printer driver 68 typically includes a color correction, dot-gain compensation processor which adjusts image color-component values to compensate for departures of the component inks' actual colors from the ideal and performs dot-gain compensation, i.e., compensation for non-linearities in the relationship between color darkness and the percentage of pixels that receive ink dots. Look-up tables are frequently employed to implement some of these functions, however, algorithm-based adjustments may be employed instead of or in conjunction with table-look-up operations.

The correction and dot gain compensation processor provides an output signal representing a pixel value to an ink duty limiter. The pixel value provided by the color correction and dot gain processor may, for example, correspond to a pixel value having values c, m, y which represent the values of cyan, magenta, and yellow, i.e., the three ink colors to be applied by a color printer such as printer 66. It should be noted that this example is convenient for the purposes of the following development, but those skilled in the art will recognize that systems expressing pixel values, as, say, locations in the red-green-blue or some other color space can also employ the present invention's teachings. If the color correction, dot-gain compensation processor provides optimal pixel values, the resultant output values result in maximum color fidelity achievable with the particular printing hardware employed.

Figure 3:
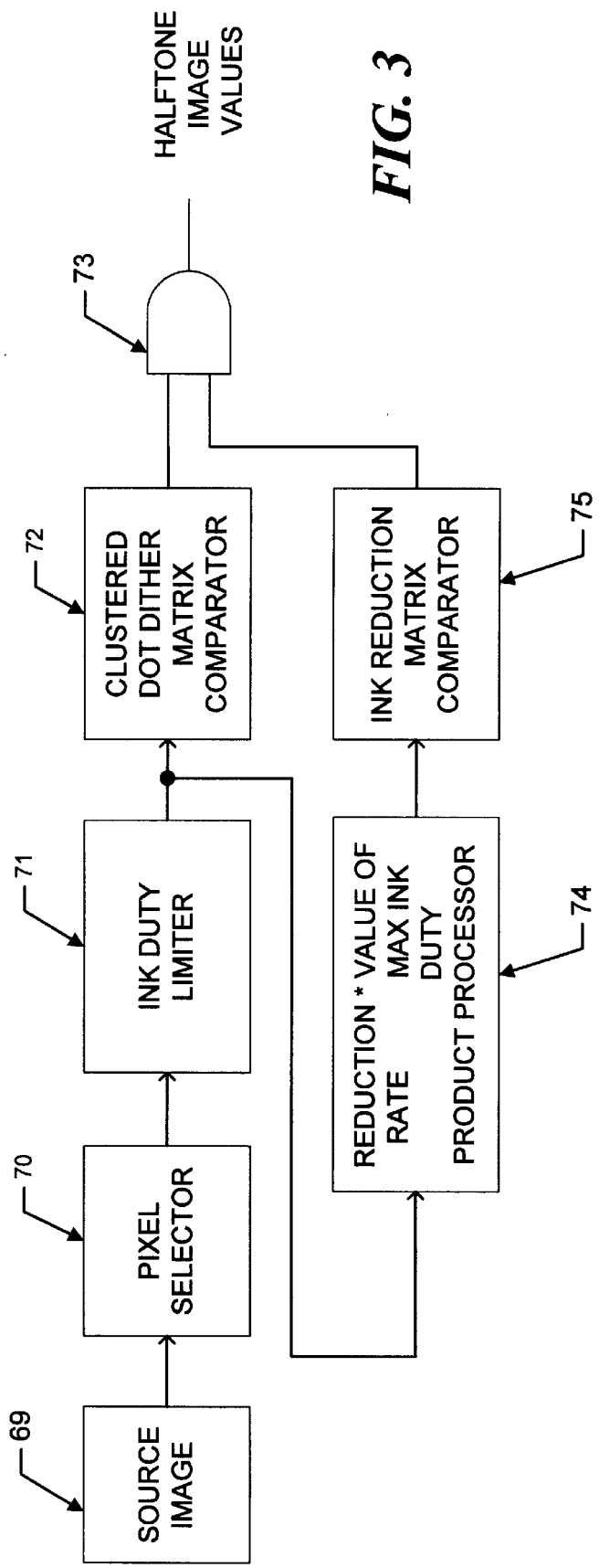
FIG. 3 is a block diagram of a system to print a source image as a halftone image.

Referring now to FIG. 3, a source image 69 comprised of a plurality of pixels is typically stored in a memory as a digital data file. A pixel selector 70 selects predetermined pixels and an ink duty limiter 71 applies an ink duty limit to the selected pixel. The ink duty reduction may be provided, for example, as a one ink reduction or a two ink reduction.

Ink duty limiter 71 adjusts the maximum-fidelity pixel values to place a limit on the quantity of ink actually deposited by the printer on a recording media. Ink duty limiter 71 may implement three separate processes for respectively imposing one-ink, two-ink and total-ink duty limits. Typically, the total ink duty limit and either the one or two ink duty limit will be used in printing a particular image. In the illustrated embodiments, the adjustments to the pixel values are all made in a hue-preserving manner:

$$\begin{bmatrix} C_{out} \\ M_{out} \\ Y_{out} \end{bmatrix} = S \begin{bmatrix} C_{input} \\ M_{input} \\ Y_{input} \end{bmatrix}$$

in which: Equation +tm (1)

$C_{out}$ corresponds to an output cyan color value;
$M_{out}$ corresponds to an output magenta color value;
$Y_{out}$ corresponds to an output yellow color value;
$C_{input}$ corresponds to an input cyan color value;
$M_{input}$ corresponds to an input magenta color value;
$Y_{input}$ corresponds to an input yellow color value; and
S corresponds to a scalar ink reduction value.

The right and left vectors in Equation (1) respectively correspond to the pixel values before and after the ink-limit imposition and S is a scalar quantity that may be a function of the ink-limiting operation's input. For the one-ink limit imposition, for instance, that limit could be 0.9, which would mean that ink of any given color could be deposited, at most, only in nine out of every ten pixels.

The simple proportionality of Equation (1) illustrates that the one-ink-limit-imposition operation reduces all input pixel values, regardless of how light the colors are that they specify. Of course, compliance with the one-ink limit does not require reducing the value of lighter colors, and one can instead employ a function that reduces only the darker colors.

A clustered-dot dither matrix comparator 72 compares the value of the selected pixel in the source image with a value of a corresponding element in the clustered-dot dither matrix. If the value of the pixel in the source image is greater than the value of the corresponding element in the clustered-dot dither matrix, then a signal having a first value is provided to a first input port of a logic gate 73 which implements a logical AND function. If, on the other hand, the value of the selected pixel in the source image is less than the value of the corresponding element in the clustered-dot dither matrix, then a signal having a second different value is provided to the first input port of logic gate 73.

A product processor 74 computes the product between a reduction rate of the selected pixel and a value corresponding to a maximum ink duty for that pixel. The reduction rate is computed as the value of the pixel output from the ink duty limiter divided by the value of the pixel in the original source image. The maximum ink duty value may be equal to the largest value in an ink reduction matrix.

An ink reduction matrix comparator 75 compares the value computed by the product processor 74 to the value of a corresponding element in an ink reduction matrix. If the value computed by the product processor 74 is greater than the value of the corresponding element in the ink reduction matrix than the ink reduction matrix comparator 75 provides a signal having a first value to a second input port of logic circuit 73. If, on the other hand, the value computed by product processor 74 is less than the value of the corresponding element in the ink reduction matrix, then ink reduction matrix comparator 75 provides a signal having a second different value to the second input port of the logic circuit 73. Depending upon the values of the signals fed thereto, logic circuit 73 provides an output signal having a first or second value depending upon a logical ANDing of the input signals fed thereto.

Figure 4:
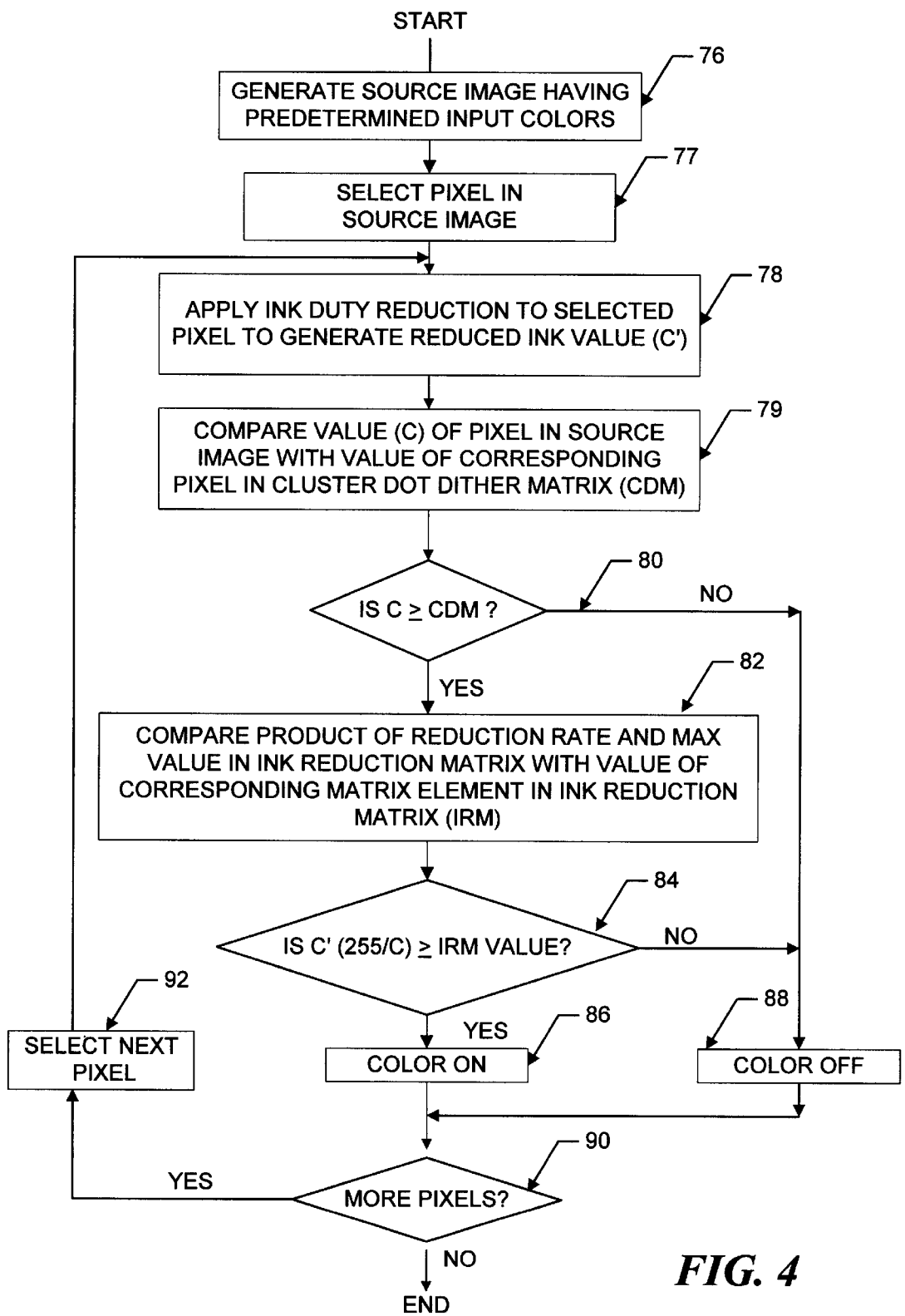
FIG. 4 is a flow diagram illustrating the steps required to generate a cluster dot dither matrix.

FIG. 4 is a flow diagram showing the processing performed by apparatus 10 (FIG. 1) to control ink discharge by a printer such as printer 48 or printer 66. The rectangular elements (typified by element 73), herein denoted "processing blocks," represent computer software instructions or groups of instructions. The diamond shaped elements (typified by element 78), herein denoted "decision blocks," represent computer software instructions, or groups of instructions which affect the execution of the computer software instructions represented by the processing blocks. Alternatively, the processing and decision blocks represent steps performed by functionally equivalent circuits such as a digital signal processor circuit or an application specific integrated circuit (ASIC).

It should be noted that the flow diagram does not depict syntax of any particular programming language. Rather, the flow diagram illustrates the functional information one skilled in the art requires to fabricate circuits or to generate computer software to perform the processing required of apparatus 10 to control the amount of ink used by a printer in printing an image. It should be noted that many routine program elements, such as initialization of loops and variables and the use of temporary variables are not shown.

Turning now to FIG. 4, as shown in step 76, a source image having predetermined input colors is generated. The source image may be generated having, for example, three input colors such as red, green, blue (r, g, b) or cyan, magenta, yellow (c, m, y) or four colors such as cyan, magenta, yellow and black (c, m, y, k). In step 77 a pixel in the source image is selected and as shown in step 78, an ink duty reduction is applied to the selected pixel. The ink duty reduction may be provided, for example, as a one ink reduction or a two ink reduction. As is known, the particular type of ink duty reduction used depends upon a variety of factors including but not limited to the number of colors used to represent the source image. Application of the ink duty reduction to the selected pixel value C results in a reduced pixel value C'. Processing then proceeds to processing block 79 where the value C of the selected pixel in the source image is compared with a value CDM of a corresponding matrix element in a clustered-dot dither matrix. In decision block 80, a decision is made as to whether the value C of the selected pixel in the source image is greater than or equal to the value CDM of the corresponding element in the clustered-dot dither matrix. If the value C of the selected pixel in the source image is less than the value of the corresponding element in the clustered-dot dither matrix, then processing proceeds to processing step 88 where the color for that pixel is turned off (i.e. no ink of that color will be printed at that pixel).

Processing then proceeds to decision block 90 where decision is made as to whether more pixels must be processed. Processing blocks 88, 92 and decision block 90 implement a loop to process each pixel in the source image. Thus, if more pixels should be processed then processing proceeds to processing block 92 where the next pixel is selected and steps 75–90 are repeated until each pixel in the source image has been processed.

If in decision block 78 decision is made that the value C of the selected pixel in the source image is greater than the value CDM of the corresponding element in the clustered-dot dither matrix then processing proceeds to processing step 82 where a reduction rate computed as C'/C is multiplied by a value corresponding to a 100% ink duty. For example, in a system in which each color is represented by eight bits, a value of 255 ($2^8$–1) corresponds to a 100% ink duty. The resulting product is compared with a value IRM of a corresponding element in an ink reduction matrix.

The ink reduction matrix may be provided as any random dither matrix such as a dispersed-dot dither matrix or a Bayer matrix. Processing then flows to decision block 84 where decision is made as to whether the product of the reduction rate and the value corresponding to the 100% ink duty is greater than or equal to the value IRM of the corresponding element in the ink reduction matrix. If the product is less than the value of the corresponding element in the ink reduction matrix, then processing flows to steps 88 and 90 as described above.

If, on the other hand the product is greater than or equal to the value IRM of the corresponding element in the ink reduction matrix, then processing proceeds to step 86 where the color is turned on (i.e. ink of that color will be printed at that pixel) and processing again flows to step 90 where decision is made as to whether more pixels in the source image must be processed. If all pixels in the source image have been processed then processing ends as shown.

By way of example, assume an image is represented by pixels each of which have color values r, g, b selected from an RGB color space. Further assume that each color of the pixel may be represented by an eight bit digital word thus, each pixel is represented by 24 total bits.

Each color of the pixel may be assigned one of 256 values ($2^8$) and thus each color may have a value between 0 and 255. The corresponding c, m, y values in a CMY color space may be computed as:

$c=255-r$ $m=255-g$ $y=255-b$

This example assumes of course that black ink, generally denoted by the letter K, is not being used to represent colors in the color image. The treatment of black ink is described in co-pending patent application Ser. No. 08/641,684 entitled INK DUTY CYCLE CONTROL assigned to the assignee of the present invention and incorporated herein by reference.

To produce ink at a reduced level, a set of values c', m', y' can be computed by applying an ink duty reduction value for a one ink duty limit ($\alpha$) and a total ink duty limit ($\gamma$) to the c, m, and y values of the source image.

Thus, letting the one ink duty limit equal eighty percent (i.e. $\alpha=80\%$) and letting the total ink duty limit equal one hundred and thirty percent (i.e. $\gamma=130\%$) and assuming source image values c, m, y are C=100% of ink duty limit;

M=90% of ink duty limit; and

Y=10% of ink duty limit.

which may be expressed as:

(100%, 90%, 10%)

Applying the one ink duty limit (i.e. $\alpha=80\%$) to the source image cmy values provides reduced color values c', m', y':

$c'=100\%*80\%=80\%$ $m'=90\%*80\%;=72\%$ $y'=10\%*80\%=8\%$ which may be expressed as:

(80%, 72%, 8%)

The total ink reduction may then be computed as c',m',y'(Y/$\Sigma$c,m,y ink duties)

In this case c'=80%;

m'=72%;

y'=8%;

y=130%; and $\Sigma$ ink duties=(80%+72%+8%)=160%

Thus the total ink reduction may be expressed as:

(80%, 72%, 8%)*(130%/160%)=(65%, 58.5%, 6.5%)

The reduction rate may then be computed from

C'/C; or

M'/M; or

Y'/Y

Thus, reduction rate=C'/C=M'/M=Y'/Y

In this case:

$$\text{reduction rate} = \frac{65}{100} = \frac{58.5}{72} = \frac{6.5}{10} = 65\%$$

Thus to maintain the total ink duty limit of one hundred and thirty percent, the original or source cmy values must be reduced by 65%. Thus steps 78–88 in the flow diagram implement the following logic condition:

if ((c$\geq$CDDM) and (the reduction rate $\times 255$)$\geq$IRM) then the color is turned on.

Thus, if the two conditions (1) c$\geq$CDDM and (2) reduction rate $\times 255 \geq$IRM are satisfied, then the color for that particular pixel is turned on. Otherwise the color is not turned on.

It should be noted that the value 255 in this example represents a 100% ink duty which is equivalent to a maximum value in the ink reduction matrix. It should be also noted that in this example yellow colorant is printed at a 6.5% ink duty. The value for y' is thus relatively small compared with the range of values which y' may take on (i.e. 0–255 or 0%–100% ink duty).

The relatively small value of a color indicates that the color is in a light tone region of the corresponding color plane. Reducing the number of dots in a color plane having a relatively light tone results in the image having a "grainy" quality or appearance. It is thus desirable to reduce the amount by which color values are reduced when the color value is relatively small compared with the range of values which the color value may take on (i.e. when the color has relatively a light tone). Reducing the amount by which the color values are reduced provides a concomitant reduction in the number of dots which are turned "off" in those regions of an image having a relatively light tone. This increases the smoothness in the appearance of light tone regions of the resultant half-tone image.

To reduce the reduction rate in such light tone regions, Equation (2) below may be used:

New Reduction Rate' =

$$\text{Old Reduction Rate} + \frac{255 - \text{Old Reduction Rate} * (THR - C)}{THR}$$

where:

Old reduction rate=C'/C;

255=max ink duty value;

C=color value in source image; and

THR=corresponds to an empirically selected threshold value.

To select the threshold value THR, the factors to consider include but are not limited to the smoothness of the image which would result from further reducing the reduction rate as well as the amount of ink bleeding which occurs in the image. Thus, the threshold value THR should be selected to provide an image which appears smooth and which has little or no ink bleeding characteristic. A particular threshold value THR may be selected by iteratively selecting a range of threshold values for a given printer, ink and paper combination and simply printing out test patterns until an optimum threshold value is determined.

Figure 5:
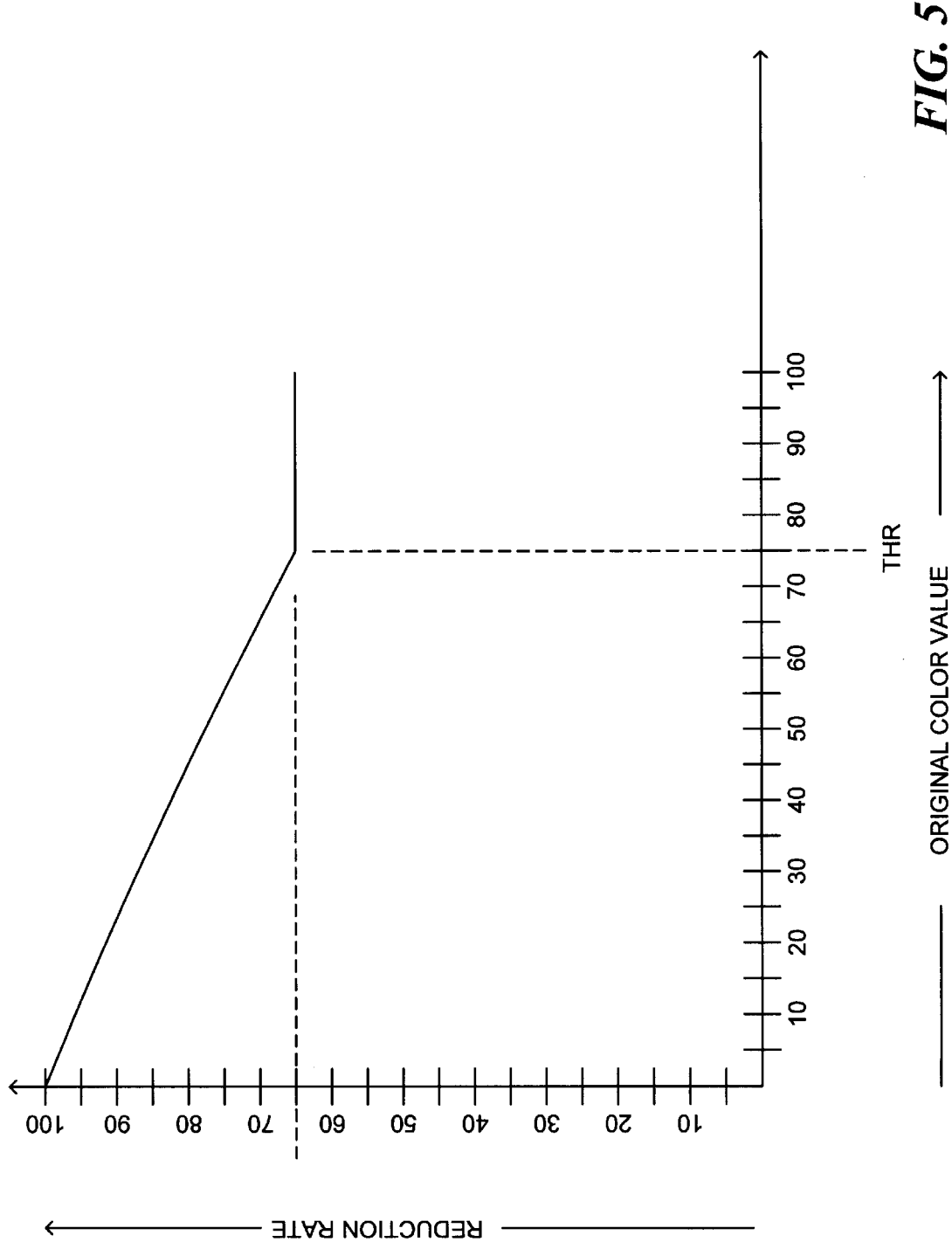
FIG. 5 is a plot of reduction ratio vs. original color value.

As illustrated in FIG. 5, in many applications it is desirable to select a threshold THR having a value which corresponds to about 75% of the original color value. As can be seen from FIG. 5 and Equation (2), the value of the new reduction rate is between 100% and the old reduction rate. As can also bee seen from FIG. 5, when the new reduction rate as computed in Equation (2) equals 65%, the original value equals 75% and the new color value is computed as the product of the new reduction rate and the original value (75%).

As indicated heretofore, aspects of this invention pertain to specific "method functions" implementable on computer systems. Those skilled in the art should readily appreciate that programs defining these functions can be delivered to a computer in many forms including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A system for generating a halftone image, the system comprising:
    an ink duty limiter to impose a total ink duty limit;
    a memory having a plurality of values stored therein, each of the plurality of values corresponding to a value of a matrix element in a clustered-dot dither matrix;
    a memory having a plurality of values stored therein, each of the values corresponding to a value a matrix element in an ink reduction matrix;
    a comparator to compare a pixel value to the value of a corresponding matrix element in the clustered-dot dither matrix and to compare a product of a reduction rate and a predetermined ink duty value and to identify each pixel having a value which is not less than the value in the clustered-dot dither matrix and having an associated product which is not less than a corresponding value in the reduction matrix; and
    a halftone image generator to receive each pixel value identified by said comparator and to generate the halftone image.

2. The system of claim 1 wherein:
    the ink reduction matrix corresponds to a random dither matrix; and
    the predetermined ink duty value corresponds to a one hundred percent ink duty.

3. The method of claim 2 wherein the ink reduction matrix is provided as a first one of a dispersed-dot dither matrix or a Bayer Matrix.

4. A method of printing an image comprising the steps of:
    (a) generating a source image having a plurality of pixels each of the pixels having at least one of a plurality of predetermined input colors;
    (b) selecting a first pixel in the source image, the first pixel having a predetermined ink duty;
    (c) reducing the ink duty of the selected pixel by a predetermined amount;
    (d) comparing a value of the selected pixel with a value of a corresponding matrix element in a clustered-dot dither matrix;
    (e) computing a reduction rate of the selected pixel and a value representing a maximum ink duty limit of the selected pixel in response to the value of the selected pixel in the source image being greater than or equal to the value of the corresponding matrix element in the clustered-dot dither matrix;
    (f) comparing the product of the reduction rate and a value representing a maximum ink duty limit of the selected pixel with a value of a corresponding matrix element in an ink reduction matrix;
    (g) turning the pixel on in response to the product of the reduction rate and the value representing the maximum ink duty limit of the selected pixel not being less than the value of the corresponding matrix element in the ink reduction matrix; and
    (h) turning the pixel off in response to the product of the reduction rate and the value representing the maximum ink duty limit of the selected pixel being less than the value of the corresponding matrix element in the ink reduction matrix.

5. The method of claim 4 wherein the step of reducing the ink duty of the selected pixel includes the step of applying a one ink reduction.

6. The method of claim 4 wherein the step of reducing the ink duty of the selected pixel includes the step of applying a two ink reduction.

7. The method of claim 4 wherein the ink reduction matrix is provided as a random dither matrix.

8. The method of claim 7 wherein the ink reduction matrix is provided as a first one of a dispersed-dot dither matrix or a Bayer Matrix.

9. The method of claim 7 further comprising the steps of repeating steps (a)–(h) for each pixel in the source image.

10. An apparatus for selectively depositing ink on a recording medium, the apparatus comprising:
    a first memory having stored therein a plurality of pixel values, each of the pixel values representing a portion of a source image;
    a second memory having stored therein an array of values from a clustered-dot dither matrix;
    a third having stored therein an array of values from an ink reduction matrix;
    a pre-processor to select a pixel value from the first memory to generate a reduced ink duty limit for the selected pixel, to compare the pixel value to a corresponding one of the values in the clustered-dot dither matrix and to compare a product of a reduction rate of the selected pixel value and a predetermined ink duty to a corresponding element in an ink reduction matrix.

11. The apparatus of claim 10 wherein:
    the ink reduction matrix is provided as a random dither matrix; and
    the pre-processor assigns a value to the selected pixel in a halftone image based on a result of the comparison between the pixel value and the corresponding value in the clustered-dot dither matrix and the comparison between the product of the reduction rate of the selected pixel value and the predetermined ink duty to the corresponding element in the ink reduction matrix.

12. The apparatus of claim 11 wherein the ink reduction matrix is provided as a first one of:
    a dispersed-dot dither matrix; and a Bayer matrix.

13. A method of printing an image on a recording medium, the method comprising the steps of:

representing a source image with a plurality of pixels, each of the pixels having at least one of a plurality of color values selected from a predetermined color space;

representing the color value of each pixel in the source image with a predetermined number of bits;

applying an ink duty reduction value to each pixel in the source image to produce reduced ink pixel values;

computing a total ink duty limit;

applying the total ink duty limit to the reduced ink pixel values; and printing dots of predetermined color on the recording medium in response to the original source image pixel value not being less than a value of a corresponding element in a clustered-dot dither matrix and the product of the reduction rate and a predetermined ink duty not being less than a value of a corresponding element in an ink reduction matrix.

14. The method of claim 13 wherein the predetermined ink duty corresponds to a 100% ink duty.

15. The method of claim 14 wherein the ink reduction matrix corresponds to random dither matrix.

16. The method of claim 15 wherein the random dither matrix is provided as a first one of a dispersed-dot dither matrix and a Bayer matrix.

17. The method of claim 13 further comprising the steps of:

detecting light tone regions of the source image; and reduce a reduction rate of the color values of the pixels which represent the light tone regions of the source image detected in said detecting step.

18. The method of claim 17 wherein the new reduction rate is computed as:

Old Reduction Rate + $\dfrac{\text{max ink duty value} - \text{Old Reduction Rate} * (THR - C)}{THR}$ .

19. The method of claim 18 wherein the ink duty reduction value corresponds to a first one of: (a) a one ink duty limit and (b) a two ink duty limit.

20. A computer program product for use with a printer, the computer program comprising:

a computer useable medium having computer readable program code to apply an ink duty reduction value to each of a plurality of pixels in a source image to produce a light plurality of reduced ink pixel values;

a computer useable medium for computing a total ink duty limit;

a computer useable medium having computer readable program code to apply the total ink duty limit to the reduced ink pixel values; and a computer readable medium having computer readable program code to turn the color on in response to the original source image pixel value not being less than a value of a corresponding element and a clustered-dot dither matrix and the product of a reduction rate and a predetermined ink duty not being less than a corresponding element in an ink reduction matrix.

21. The computer program product of claim 20 further comprising:

computer readable program code means having computer readable program code to detect light tone regions of the source image; and computer readable program code means to reduce a reduction rate of the color values of the pixels which represent the light tone regions of the source image detected by said computer readable program code means to detect light tone regions of the source image.

22. The computer program product of claim 21 wherein the new reduction rate is computed as:

Old Reduction Rate + $\dfrac{255 - \text{Old Reduction Rate} * (THR - C)}{THR}$

* * * * *